United States Patent [19]

Murata et al.

[11] Patent Number: 4,803,242

[45] Date of Patent: Feb. 7, 1989

[54] DIAPHRAGM FOR LOUDSPEAKERS

[75] Inventors: Kousaku Murata, Kobe; Satoshi Takayama, Osaka; Hiroyuki Takewa, Osaka; Shuji Saiki, Osaka; Tsuneo Tanaka, Nishinomiya, all of Japan

[73] Assignee: Matsushita Electric Inductrial Co., Ltd., Osaka, Japan

[21] Appl. No.: 80,923

[22] Filed: Aug. 3, 1987

[30] Foreign Application Priority Data

Aug. 4, 1986 [JP] Japan ................................ 61-182909

[51] Int. Cl.[4] ........................... C08L 1/02; C08L 5/08; C08L 51/02; H04R 9/06

[52] U.S. Cl. ........................................ 524/35; 524/10; 524/56; 106/163.1; 162/158; 162/175; 381/204

[58] Field of Search ....................... 524/34, 35, 10, 56; 423/413; 106/162, 163.1; 162/175, 158

[56] References Cited

U.S. PATENT DOCUMENTS 3,768,590 10/1973 Yocum ................................ 181/167

3,937,905 2/1976 Manger .............................. 181/167

FOREIGN PATENT DOCUMENTS 55-8078 3/1980 Japan .................................. 181/167

*Primary Examiner*—Allan M. Lieberman

*Attorney, Agent, or Firm*—Pollock, VandeSande & Priddy

[57] ABSTRACT

A diaphragm for loudspeakers comprises chitin as a natural high polymeric material having a large value of Young's modulus and kraft pulp having large mechanical internal loss. Therefore, the deformation and the partial vibrations of the diaphragm during diaphragm operation do not come out due to the use of the chitin, because the flexural rigidity of the diaphragm is considerably large. Mechanical internal loss is also large owing to the use of the kraft pulp. As a result, it is possible to obtain a loudspeaker which has little fluctuation in frequency response, and which provides a superior sound pressure-frequency response, a superior distortion factor and a superior phase response.

2 Claims, 2 Drawing Sheets

DIAPHRAGM FOR LOUDSPEAKERS

BACKGROUND OF THE INVENTION

1. Field of the Invention

This invention relates generally to sound emitting apparatus, and particularly to a diaphragm for loudspeakers.

2. Prior Art

Recently, it has been required that loudspeakers have acoustic characteristics superior to conventional loudspeakers in industrial fields in connection with cassette tape recorders, micro cassette recorders, and hi-fi stereos. With this requirement, the performance of diaphragms of the loudspeakers has also been considered as an important factor.

As is well known in the prior art, loudspeakers usually comprise a vibration system such as a diaphragm, a voice coil bobbin, and a voice-coil, and further comprise a magnetic circuit system such as a magnet, a pole piece, a top plate and a yoke. When an audio-frequency signal is applied to a lead of the voice-coil which is placed in a uniform magnetic field, the voice-coil will move either inward or outward by generating electromagnetic forces, depending on the instantaneous polarity of the applied audio signal. Thus, loudspeakers are electroacoustic transducers used for the purpose of transforming electrical energy into acoustical energy through the mechanical motion of the diaphragm, so that acoustic waves are emanated from the diaphragm.

As an ideal diaphragm for the loudspeakers, it is required that the diaphragm moves like a piston in response to any frequency within a frequency band which is to be used. If deformation of the diaphragm or partial vibration comes out during the vibrations thereof, high-fidelity reproducing cannot be actualized due to deterioration of a sound pressure-frequency response of a distortion factor, and of a phase response, etc.

However, according to conventional paper cone diaphragms and plastic diaphragms, since $E/\rho$ (wherein E is a Young's modulus, and $\rho$ is a density) of these diaphragm materials is small, a high resonant frequency thereof is low. Therefore, there is a drawback that conventional loudspeakers cannot perform reproduction with high fidelity in response to the frequency in a high frequency band.

SUMMARY OF THE INVENTION

The present invention has been developed in order to remove the above-described drawbacks inherent to the conventional diaphragm for loudspeakers.

It is, therefore, an object of the present invention to provide a new and useful diaphragm for loudspeakers and the present invention contemplates providing a diaphragm which hardly suffers deformation and partial vibration during diaphram operation and whose high range resonance frequency is high.

According to a feature of the present invention, a diaphragm comprises chitin as a natural high polymeric material having a large value of Young's modulus and kraft pulp having large mechanical internal loss. Therefore, the flexural rigidity of such a diaphragm is considerably large, so that the deformation and the partial vibrations during the diaphragm operation hardly come out due to the use of the chitin. Besides, the mechanical internal loss of the diaphragm is also large owing to the use of the kraft pulp. As a result, it is possible to obtain loudspeakers which have little fluctuation in frequency response, and which provide a superior sound pressure-frequency response, a superior distortion factor, and a superior phase response thereof.

Moreover, since a main component of the diaphragm material according to the present invention is kraft pulp, a conventional paper manufacturing process can be adopted as the manufacturing process of the diaphragm of the present invention. As a result, the diaphragm can be mass-produced.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
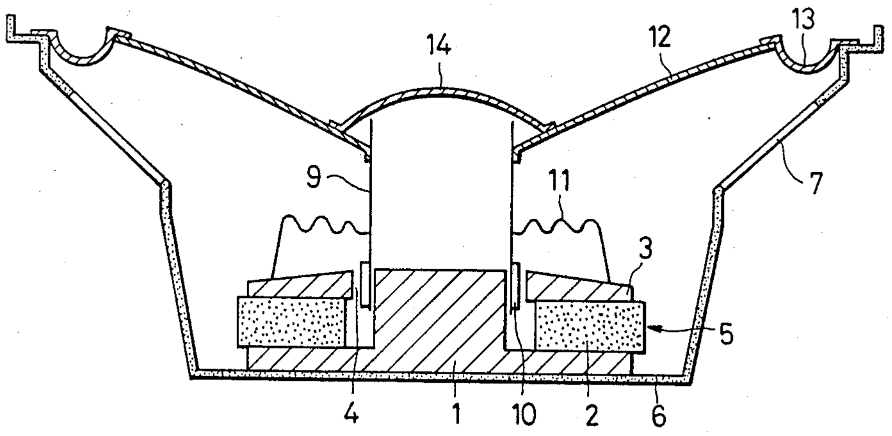
FIG. 1 is a cross-sectional view of a vibration system of a loudspeaker according to an embodiment of the present invention.

Referring to FIG. 1, a schematic cross-sectional view of a vibration system of a loudspeaker according to an embodiment of the present invention is shown. The vibration system generally comprises a bottom plate 1, a ring magnet 2, a top plate 3, a frame 6, a voice coil bobbin 9, a damper 11, a diaphragm 12, and a dust cap 14.

The ring magnet 2 is sandwiched in between the top plate 3 and the bottom plate 1 such that an air gap 4 is formed, thereby forming a magnetic circuit 5. The frame 6 is made of a magnetic material, and openings 7 are made in the upper portion thereof. The bottom of the frame 6 is larger than the configuration of the magnetic circuit 5, and the bottom plate 1 is fixed to the inner wall of the bottom of the frame 6.

The voice coil bobbin 9 around which a voice coil 10 is wound is attached to the top plate 3 via the damper 11 so that the voice coil 10 is suspended into the air gap 4. The inner edge portion of the center hole of the diaphragm 12 is fixed to the voice coil bobbin 9, and the outer peripheral edge portion of the diaphragm 12 is fixed to the frame 6 via a flexible edge 13. The center hole of the diaphragm 12 is covered and closed by the dust cap 14.

Now the operation of the speaker having the above-mentioned structure will be described. When audio-frequency signals are applied to the voice-coil 10 which is placed in a uniform magnetic field, the voice-coil 10 will move either inward or outward by generating electromagnetic force, depending on the instantaneous polarity of the applied audio signals. This movement is transmitted to the diaphragm 12 via the voice coil bobbin 9. Thus, the loudspeaker is an electroacoustic transducer used for the purpose of transforming electrical energy into acoustical energy through the mechanical motion of the diaphragm 12, so that acoustic waves are emanated.

Next, a manufacturing process of the diaphragm 12 will be described. As defined before, the loudspeaker diaphragm of the present invention substantially comprises chitin as a natural high polymeric material and kraft pulp. First, the kraft pulp and the chitin powder are uniformly mixed. The size of the chitin powder is 50–500 mesh, preferably 100–500. The ratio of the chitin powder in this uniform mixture is generally 30 weight percent or below, preferably 30 weight percent. Then, the diaphragm is produced by a conventional paper manufacturing process using the mixed material, so as to have a diameter of 28 mm and unit weight of 30 g/m$^2$.

When mixing, the kraft pulp and the chitin powder may be graft-polymerized with polyvinyl alcohol. This obtained graft-polymer is a lower-polymerized graft-copolymer, and is produced by using 3 percent concentration solution, which is 1 part by weight of polyvinyl alcohol and 99 parts by weight of chitin powder which is then diluted with alcohol. The solution is radiation-induced polymerized by $\alpha$-ray at a temperature of approximately 50°. In this case, since both the polyvinyl alcohol and the kraft pulp have hydroxyl groups, the affinity between these materials is large thereby providing sufficient binding capacity. Therefore, a strong sheet of paper can be produced. In addition, the polyvinyl alcohol which is graft-polymerized to the chitin has a hydrophilic property. Therefore, water and the polyvinyl alcohol do not separate during processing.

Figure 2:
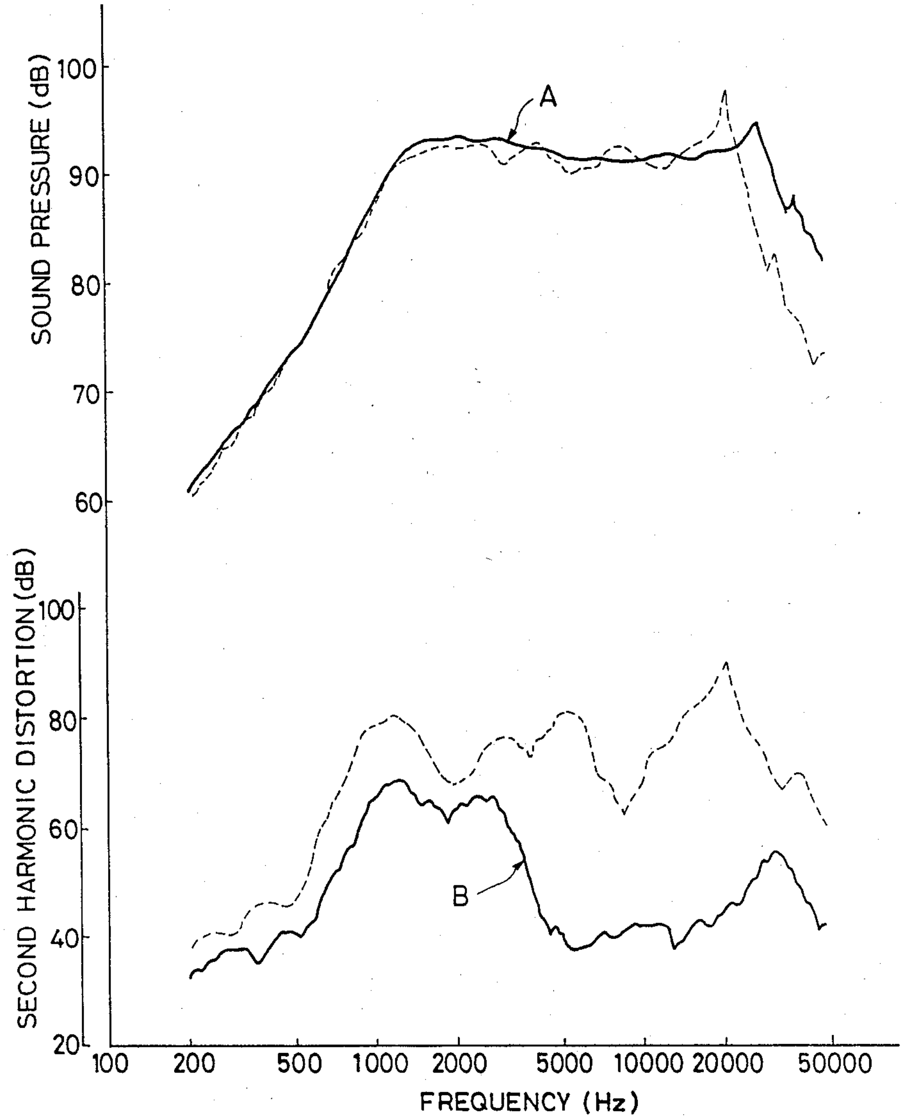
FIG. 2 is a graph showing a sound pressure-frequency response and a second harmonic distortion characteristic.

References A and B of FIG. 2 respectively show a sound pressure-frequency response and a second harmonic distortion characteristic of a loudspeaker using the diaphragm of an embodiment of the present invention. As will be understood from FIG. 2, the distortion factor of the present invention loudspeaker is improved approximately 20 dB in comparison with the distortion factor of a conventional loudspeaker using a diaphragm which is the same configuration as the diaphragm of the embodiment and which is made of aluminum. In addition, according to the present invention, the peak dip of an output sound pressure of the loudspeaker is ±3 dB. This value is being improved by ±3 dB in comparison with the conventional loudspeaker. Besides, the high resonance frequency in the present invention is being improved from 21 kHz to 28 kHz.

Although the configuration of the diaphragm of the embodiment according to the present invention is cone-shape, flat or dome-shape may also be applicable.

As will be understood from the above, the loudspeaker diaphragm according to the present invention has great advantages in that the diaphragm comprises chitin and kraft pulp. It will become apparent that the diaphragm exhibits a large flexural rigidity by the chitin effect and a large internal loss by the kraft pulp effect, in view of the fact that the diaphragm of the present invention causes the superior sound pressure-frequency response, and the superior second harmonic distortion characteristic.

The above-described embodiment is just an example of the present invention, and therefore, it will be apparent for those skilled in the art that many modifications and variations may be made without departing from the scope of the present invention.

What is claimed is:

1. A loudspeaker diaphragm comprising a uniform mixture of kraft pulp and chitin powder having 50–500 mesh size, and the ratio of said chitin powder in said uniform mixture ranging not larger than 30 weight percent.

2. A loudspeaker diaphragm as claimed in claim 1, wherein said chitin powder is graft-polymerized with polyvinyl alcohol.

* * * * *